US012803420B2

(12) United States Patent
Lin et al.

(10) Patent No.: US 12,803,420 B2
(45) Date of Patent: Nov. 17, 2026

(54) POWER CONVERSION AND TRANSMISSION SYSTEM AND METHOD FOR CONTROLLING THE SAME

(71) Applicant: Richtek Technology Corporation, Zhubei City (TW)

(72) Inventors: Shin-Li Lin, Hsinchu (TW); Kun-Han Yang, New Taipei (TW); Syuan-Zong Lan, Changhua (TW); Ta-Yung Yang, Taoyuan (TW)

(73) Assignee: RICHTEK TECHNOLOGY CORPORATION, Zhubei City (TW)

( * ) Notice: Subject to any disclaimer, the term of this patent is extended or adjusted under 35 U.S.C. 154(b) by 145 days.

(21) Appl. No.: 18/939,636

(22) Filed: Nov. 7, 2024

(65) Prior Publication Data

US 2025/0175073 A1 May 29, 2025

Related U.S. Application Data

(60) Provisional application No. 63/603,223, filed on Nov. 28, 2023.

(30) Foreign Application Priority Data

Oct. 30, 2024 (TW) ................................ 113141575

(51) Int. Cl.
*H02M 1/08* (2006.01)
*H02M 1/00* (2006.01)
*H02M 1/32* (2007.01)

(52) U.S. Cl.
CPC .......... *H02M 1/32* (2013.01); *H02M 1/0009* (2021.05); *H02M 1/08* (2013.01)

(58) Field of Classification Search
CPC .......... H02H 7/00; H02H 7/001; H02H 7/003; H02H 7/005; H02H 7/006; H02H 7/008; H02H 7/10; H02H 7/12; H02H 7/1203; H02H 7/1209; H02H 7/1213; H02H 7/1216; H02H 7/125; H02H 7/122; H02M 1/32; H02M 1/0009; H02M 1/125; H02M 1/08; H02M 1/00; G06F 1/263; G06F 1/266; G06F 1/26; G06F 1/20; G06F 1/3209; G06F 1/3287; G06F 1/305; H02J 1/102; H04L 12/10; H04L 9/40
See application file for complete search history.

(56) References Cited

U.S. PATENT DOCUMENTS

2019/0036521 A1* 1/2019 Wu ......................... H03K 5/26

* cited by examiner

*Primary Examiner* — Bryan R Perez
(74) *Attorney, Agent, or Firm* — Tung & Associates

(57) ABSTRACT

A power conversion and transmission system includes a power provider unit, a load unit and a cable. The power provider unit includes a power conversion circuit for converting an input power into an intermediate power, and a path switch coupled between the intermediate power and a bus power. The cable includes a power sub-cable, a communication sub-cable, and a ground sub-cable, for coupling the provider-end power, communication, and ground nodes of the power provider unit respectively to the corresponding nodes of the load unit. At an initial time point, voltage the of the provider-end communication node is sensed and recorded as the initial voltage level. At a determination time point, if the difference between the present voltage level of the provider-end communication node and the initial voltage level exceeds a threshold value, a power source limiting operation is initiated.

12 Claims, 9 Drawing Sheets

POWER CONVERSION AND TRANSMISSION SYSTEM AND METHOD FOR CONTROLLING THE SAME

CROSS REFERENCE

The present invention claims priority to U.S. 63/603,223 filed on Nov. 28, 2023 and claims priority to TW 113141575 filed on Oct. 30, 2024.

BACKGROUND OF THE INVENTION

Field of Invention

The present invention relates to a power conversion and transmission system, particularly one that has fault detection and performs current or power limiting functions. The invention also relates to a control method for managing the power conversion and transmission system.

Description of Related Art

FIG. 1 shows a prior art power conversion and transmission system, which includes a power provider unit 10 and a load unit 20 connected via a cable 50. The power provider unit 10 includes a power conversion circuit 110 and a provider control circuit 120. The provider control circuit 120 controls the power conversion circuit 110 to generate a bus power (which has a bus voltage VBUS and a bus current IBUS) and the bus power is supplied to the load unit 20. The power provider unit 10 also includes a current sensing resistor RCS. The provider control circuit can detect the bus current IBUS provided by the power provider unit by sensing the voltage VCS (current sensing signal) across the current sensing resistor RCS.

When the bus current IBUS exceeds a certain threshold, the provider control circuit will initiate an overcurrent protection mechanism by controlling a path control switch between the cable and the power conversion circuit to cut off the path to prevent overcurrent. However, in the prior art, if the current sensing resistor RCS is short-circuited, although the bus current IBUS may be very large, the sensed voltage of the current sensing signal VCS remains very small even when bus current IBUS exceeding the overcurrent threshold due to the extremely low resistance of the shorted RCS. This leads to the situation where even if an overcurrent occurs, the system cannot correctly determine the short circuit of the current sensing resistor RCS through the voltage VCS, and thus cannot initiate the appropriate protection mechanism. This is a drawback in the prior art that urgently needs improvement.

In view of this, the present invention aims to propose an improved power provider unit architecture, which can determine whether an overcurrent occurs or the current sensing resistor RCS is short-circuited by detecting certain electrical characteristics at the terminals connected with the cable, even if the current sensing resistor RCS is short-circuited. This improvement can overcome the deficiency of the prior art in failing to correctly detect the short circuit of the current sensing resistor RCS, providing a more reliable protection mechanism.

SUMMARY OF THE INVENTION

From one perspective, the present invention provides a power conversion and transmission system comprising: a power provider unit including: a power conversion circuit for converting an input power into an intermediate output power; a charge pump circuit for generating a gate voltage; a provider control circuit for controlling the power conversion circuit and generating an output control signal to control the charge pump circuit; and a path switch coupled between the intermediate output power and a bus power, controlled by the gate voltage, for turning on or off the electrical connection between the intermediate output power and the bus power, wherein the path switch comprises an N-type MOSFET (Metal-Oxide-Semiconductor Field-Effect Transistor); a load unit coupled between the bus power and a load-end ground node, wherein the bus power supplies power to the load unit and the load unit determines a bus current of the bus power; and a cable including a power sub-cable, a communication sub-cable, and a ground sub-cable, configured to optionally couple a provider-end power node, a provider-end communication node, and a provider-end ground node of the power provider unit correspondingly to a load-end power node, a load-end communication node, and the load-end ground node of the load unit, respectively, wherein the bus current flows through the power sub-cable and the ground sub-cable; wherein at determination time point, the provider control circuit senses a present voltage level of the provider-end communication node, and if the present voltage level exceeds a first threshold, a power limiting operation is initiated; or at the determination time point, the provider control circuit calculates a difference between the present voltage level and an initial voltage level, and if the difference exceeds a second threshold, the power limiting operation is initiated, wherein the provider control circuit senses the voltage of the provider-end communication node at an initial time point and records it as the initial voltage level; wherein the timing for enabling the output control signal occurs before the initial time point and the determination time point, with the initial time point occurring before the determination time point; wherein in the power limiting operation, the provider control circuit controls the path switch to shut off power supply to the load unit or controls the path switch to limit power level or current level of the bus power.

In one embodiment, the ground sub-cable has a parasitic resistance.

In one embodiment, the load unit includes a resistive device coupled between the load-end communication node and the load-end ground node.

In one embodiment, a level of the gate voltage generated by the charge pump circuit is programmable.

In one embodiment, the power conversion and transmission system further comprises a current sensing resistor configured in a current path of the bus current to generate a current sensing voltage proportional to the bus current; wherein at the determination time point, the power limiting operation is initiated further when the voltage level of the current sensing resistor is below a third threshold; wherein a level of the bus current represented by the first threshold is greater than or equal to a level of the bus current represented by the third threshold, or, a level of the bus current represented by the second threshold is greater than or equal to a level of the bus current represented by the third threshold.

In one embodiment, the determination time point occurs after a readiness time point; wherein the readiness time point refers to a time point when the bus voltage rises to a steady-state voltage; or wherein the readiness time point refers to a time point when the gate voltage of the path switch rises to a final value.

In one embodiment, the determination time point includes plural time points triggered periodically after the readiness time point, or the determination time point is continuous time after the readiness time point.

From another perspective, the present invention provides a method for controlling a power conversion and transmission system, the power conversion and transmission system comprising a power provider unit, a load unit, and a cable, the power provider unit including: a power conversion circuit for converting an input power into an intermediate output power; and a path switch coupled between the intermediate output power and a bus power for turning on or off the electrical connection between the intermediate output power and the bus power; wherein the load unit is coupled between the bus power and a load-end ground node, wherein the bus power supplies power to the load unit and the load unit determines a bus current of the bus power; wherein the cable includes a power sub-cable, a communication sub-cable, and a ground sub-cable, configured to optionally couple a provider-end power node, a provider-end communication node, and a provider-end ground node of the power provider unit corresponding to a load-end power node, a load-end communication node, and the load-end ground node of the load unit, respectively, wherein the bus current flows through the power sub-cable and the ground sub-cable; the method comprising: starting enabling the path switch; at a determination time point, sensing the present voltage level of the provider-end communication node; and if the present voltage level exceeds a first threshold, initiating a power limiting operation; or the method comprising: starting enabling the path switch; at a determination time point, calculating a difference between the present voltage level and an initial voltage level; and if the difference exceeds a second threshold, initiating the power limiting operation; wherein the voltage at the provider-end communication node at an initial time point corresponds to the initial voltage level; wherein the timing for starting enabling the path switch occurs before the initial time point and the determination time point, with the initial time point occurring before the determination time point; wherein the steps of the power limiting operation include: controlling the path switch to shut off power to the load unit or controlling the path switch to limit power level or current level of the bus power.

In one embodiment, the step of enabling the path switch includes soft starting the path switch for turning on.

In one embodiment, the power conversion and transmission system further includes a current sensing resistor configured in a current path of the bus current to generate a current sensing voltage proportional to the bus current; wherein the method further includes: at the determination time point, initiating the power limiting operation further when the voltage level of the current sensing resistor is below a third threshold; wherein a level of the bus current represented by the first threshold is greater than or equal to a level of the bus current represented by the third threshold, or, a level of the bus current represented by the second threshold is greater than or equal to a level of the bus current represented by the third threshold.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
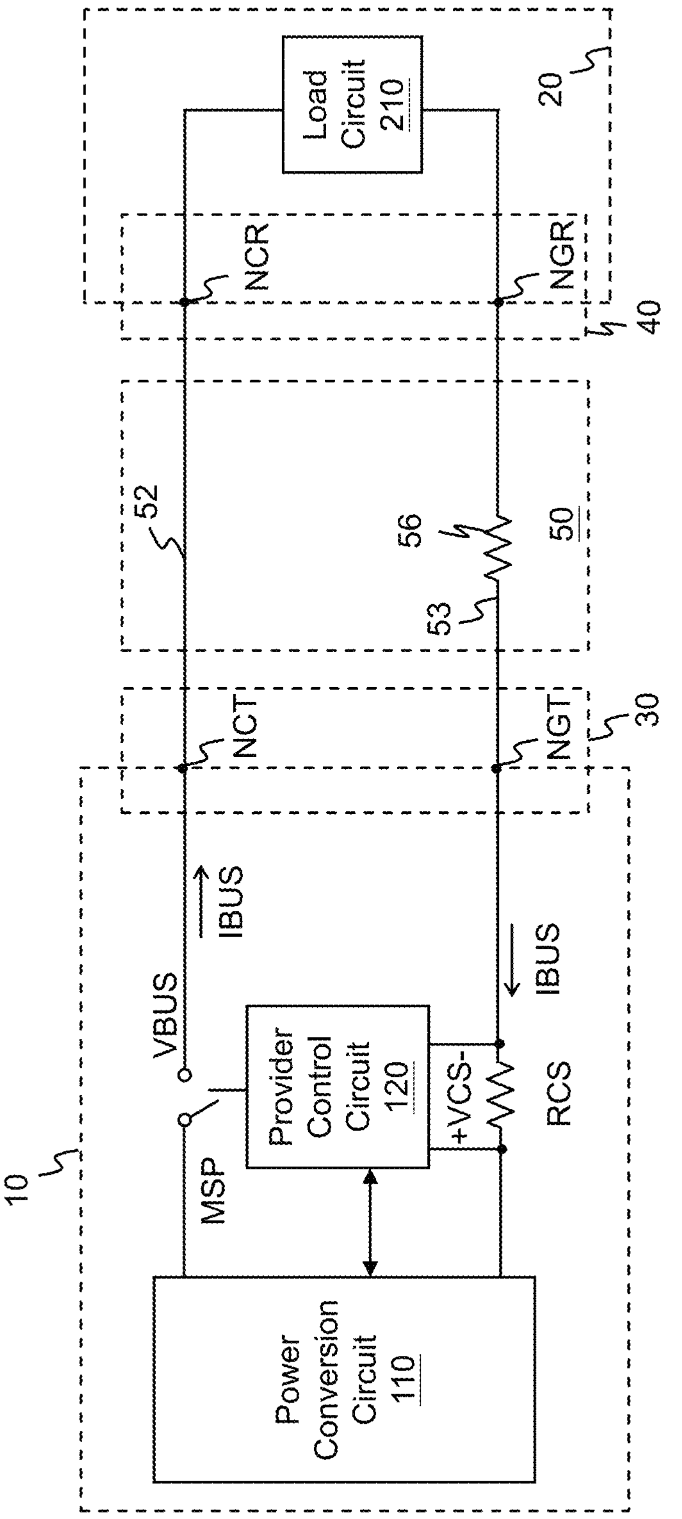
FIG. 1 shows a prior art power conversion and transmission system.
Figure 2:
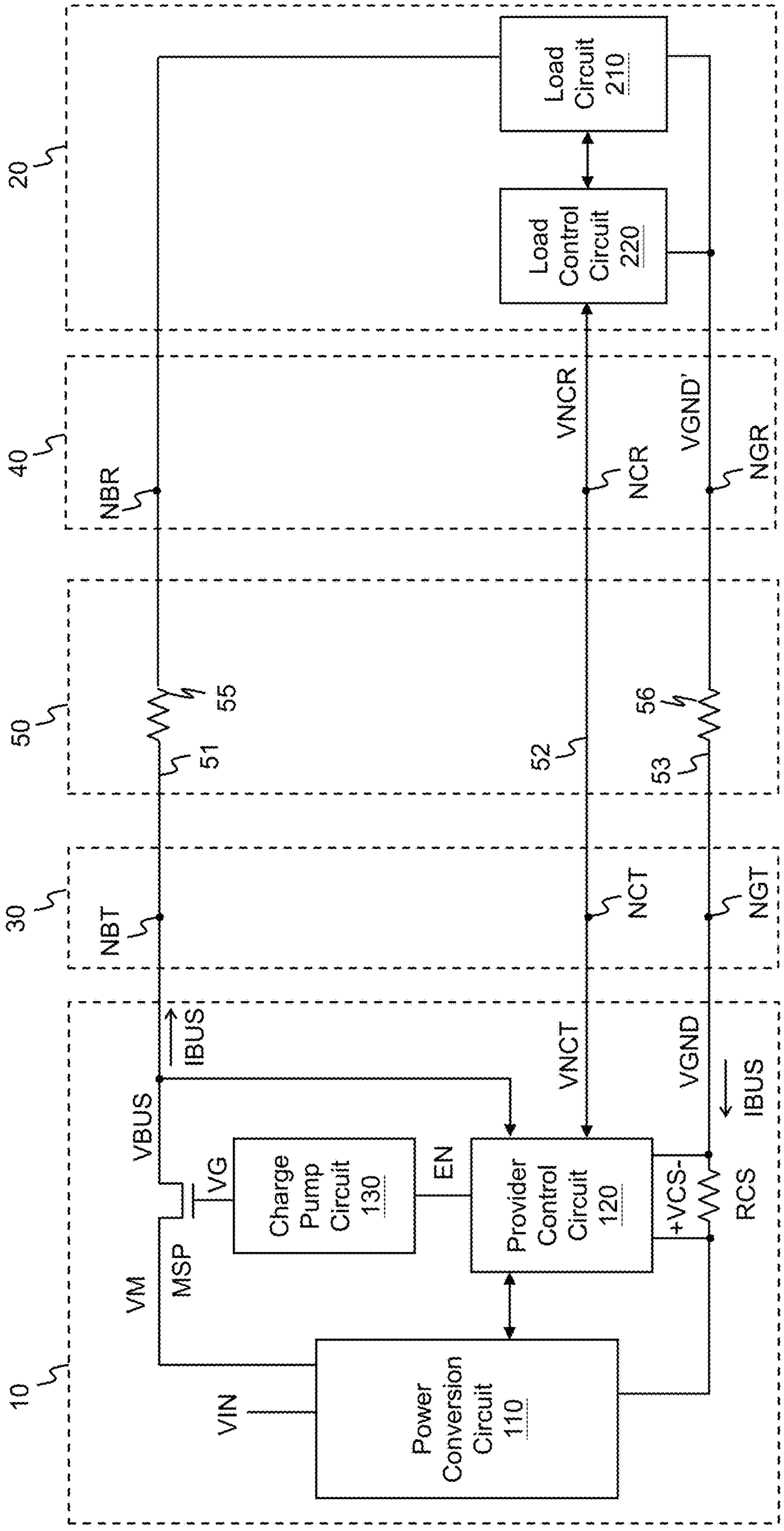
FIG. 2 shows a block diagram of a power conversion and transmission system according to one embodiment of the present invention.

FIG. 2 shows a block diagram of a power conversion and transmission system according to one embodiment of the present invention. In this embodiment, the power conversion and transmission system includes a power provider unit 10 and a load unit 20, which are connected via a cable 50. The power provider unit 10 includes three connection nodes: a provider-end power node NBT, a provider-end communication node NCT, and a provider-end ground node NGT.

Correspondingly, the load unit 20 also includes three corresponding nodes: a load-end power node NBR, a load-end communication node NCR, and a load-end ground node NGR.

The cable 50 is configured for connecting the three nodes of the power provider unit 10 to the three corresponding nodes of the load unit 20, thereby facilitating power and communication transmission.

In one embodiment, these nodes can be located on a connector 30 of the power provider unit 10, while the corresponding nodes of the load unit 20 can be located on a connector 40 of the load unit 20. In the case where both sides have connectors, the cable is fully removable. However, these connectors are not necessarily required; the two units can also be directly coupled through one of the nodes via cable 50, with only one side having a connector while the other side is fixedly connected.

In a specific embodiment, the aforementioned cable 50 and connectors 30 and 40 comply with the USB-C specification. In one embodiment, the provider-end power node NBT corresponds to the bus power VBUS in the USB-C specification, the provider-end communication node NCT corresponds to configuration channels CC1 or CC2 in the USB-C specification, and the provider-end ground node NGT corresponds to the ground GND in the USB-C specification.

In a specific embodiment, the power provider unit 10 includes: a power conversion circuit 110, a provider control circuit 120, a charge pump circuit 130, a path switch MSP, and a current sensing resistor RCS. The load unit 20 includes: a load control circuit 220 and a load circuit 210.

The provider control circuit 120 is configured to control the power conversion circuit 110 to convert the input power VIN into an intermediate output power VM. The path switch MSP is coupled between the intermediate output power VM and the bus power to switch the electrical connection between the intermediate output power VM and the bus power on or off. The bus power has a bus voltage VBUS and a bus current IBUS. The bus power is connected to the provider-end power node NBT, transmitted through the power sub-cable 51 in cable 50 to the load unit 20, and powers the load circuit 210 within the load unit 20 via the load-end power node NBR.

The load circuit 210 determines the power consumed, thereby determining the level of the bus current IBUS. This current flows through the load circuit, then returns to the transmitting unit 10 via the load-end ground node NGR and the ground sub-cable 53 in cable 50 to the provider-end ground node NGT. Ultimately, the bus current IBUS flows through the current sensing resistor RCS and couples back to the power conversion circuit 110, forming a power loop.

In one embodiment, the path switch MSP is an NMOSFET (N-channel metal-oxide-semiconductor field-effect transistor), and the provider control circuit 120 controls the charge pump circuit 130 to generate the gate voltage VG of the path switch MSP to control its conduction and cutoff.

In one embodiment, the level of the bus voltage VBUS is determined by communication between the provider control circuit 120 and the load control circuit 220 through configuration channels CC1 or CC2, and the provider control circuit 120 controls the power conversion circuit 110 to produce an intermediate output power VM with a corresponding level, controlling the path switch MSP to determine the electrical connection between the intermediate output power VM and the bus voltage VBUS, thereby the bus power is transmitted to the load unit 20 through the relevant connection nodes.

Figure 4:
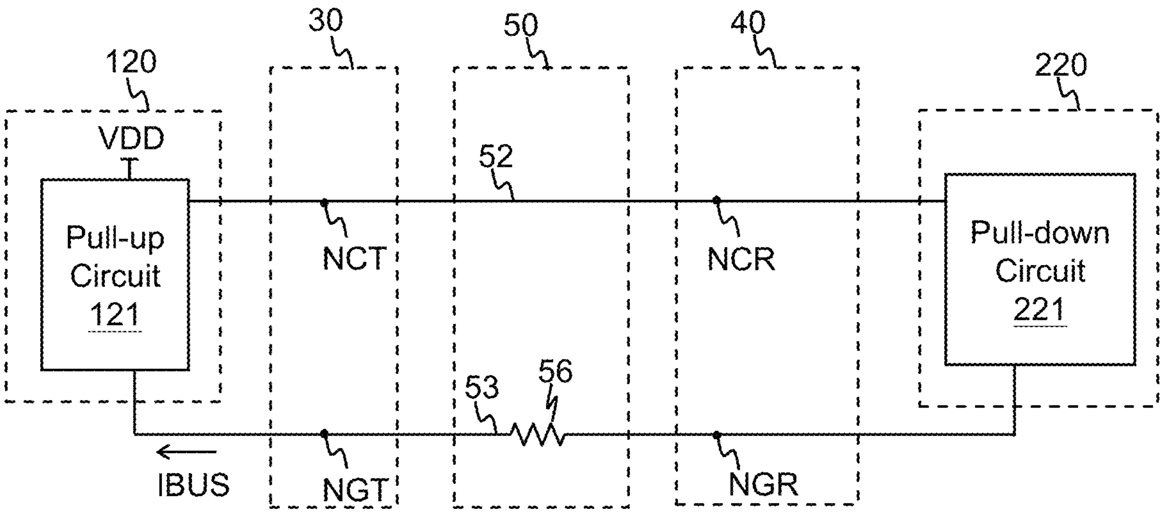
FIG. 4 shows a block diagram of the pull-up circuit and pull-down circuit in one embodiment of the present invention.

FIG. 4 shows a block diagram of the pull-up circuit and pull-down circuit in one embodiment of the present invention. In one embodiment, to determine whether the power provider unit 10 is coupled to the load unit 20, the provider control circuit 120 includes a pull-up circuit 121, while the load control circuit 220 includes a pull-down circuit 221. When the power provider unit 10 is coupled to the load unit 20, the pull-up circuit 121 is coupled through the provider-end communication node NCT and the communication sub-cable 52 in cable 50 to the load-end communication node NCR, which is then coupled to the pull-down circuit 221. The pull-up circuit 121 has a resistive device coupled between the provider-end communication node NCT and the supply voltage VDD. The pull-down circuit 221 has a resistive device coupled between the load-end communication node NCR and the load-end ground node NGR. The details of the resistive devices will be elaborated later.

When the power provider unit 10 and the load unit 20 are not coupled, the voltage VNCT at the provider-end communication node NCT will be pulled up to the maximum voltage, which is the supply voltage VDD; meanwhile, the voltage VNCR at the load-end communication node NCR will be pulled down to the ground voltage, which is 0 V.

When the power provider unit 10 and the load unit 20 are coupled via cable 50, the pull-up circuit 121 and the pull-down circuit 221 will pull the voltage VNCT at the provider-end communication node NCT and the voltage VNCR at the load-end communication node NCR to an intermediate voltage, which is greater than 0 V but less than the supply voltage VDD. The provider control circuit 120 or the load control circuit can determine that the power provider unit 10 and the load unit 20 are coupled by detecting the level of the voltage VNCT or the voltage VNCR.

Figure 5A:
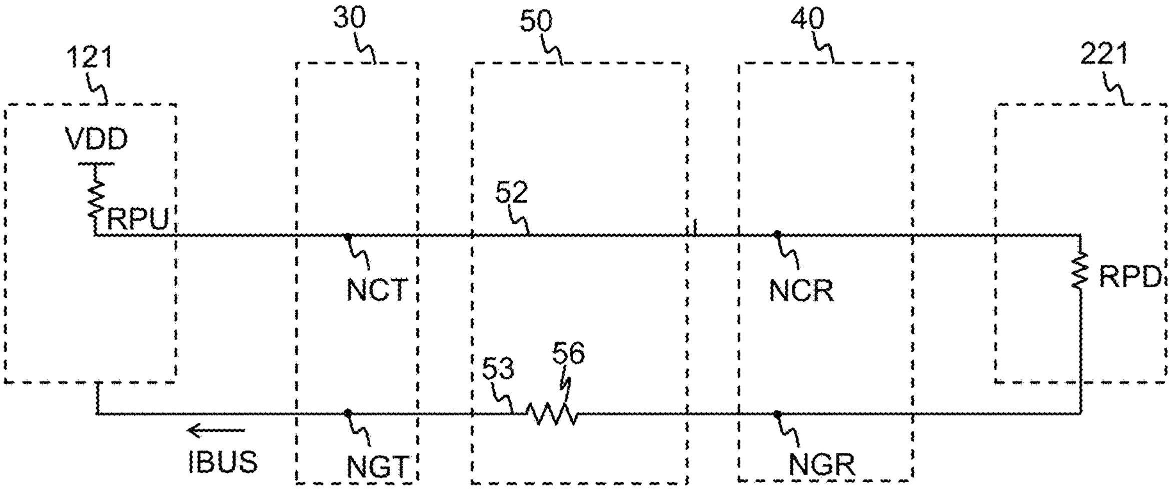
FIGS. 5A to 5C show schematic diagrams of various specific embodiments of the pull-up and pull-down circuits in the present invention.
Figure 5B:
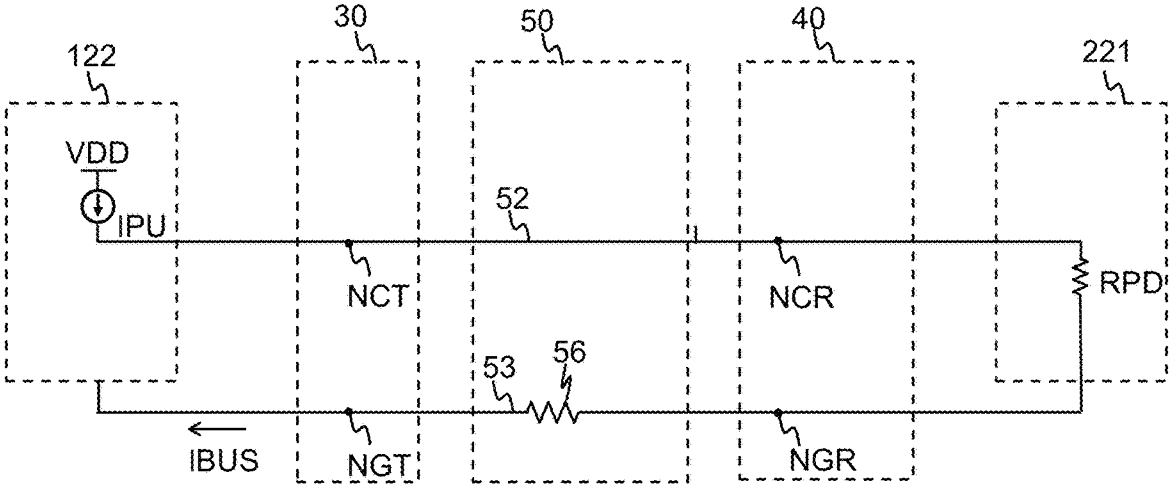
Figure 5C:
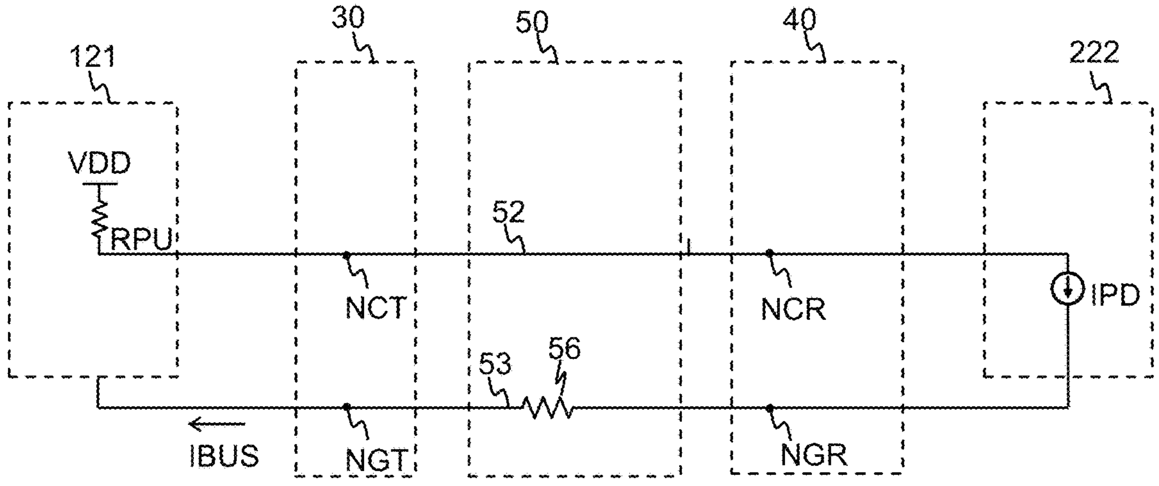

FIGS. 5A to 5C show schematic diagrams of various specific embodiments of the pull-up and pull-down circuits in the present invention.

As shown in FIG. 5A, in this embodiment, the pull-up circuit 121 includes a pull-up resistor RPU, coupled between the supply voltage VDD and the provider-end communication node NCT. The pull-down circuit 221 includes a pull-down resistor RPD, coupled between the load-end communication node NCR and the load-end ground node NGR.

As shown in FIG. 5B, in this embodiment, the pull-down circuit 221 remains as the pull-down resistor RPD, while the pull-up circuit 122 includes a pull-up current source IPU, coupled between the supply voltage VDD and the provider-end communication node NCT.

As shown in FIG. 5C, in this embodiment, the pull-up circuit 121 employs the pull-up resistor RPU. The pull-down circuit 222 includes a pull-down current source IPD, coupled between the load-end communication node NCR and the load-end ground node NGR.

Continuing to refer to FIG. 2, in one embodiment, when the current sensing resistor RCS is functioning normally, the current sensing resistor RCS generates a corresponding current sensing signal VCS based on the level of the bus current IBUS. The provider control circuit 120 determines whether the bus current IBUS exceeds a predetermined overcurrent threshold based on the voltage level of the current sensing signal VCS. If the voltage level of the current sensing signal VCS exceeds a threshold VTH0 (corresponding to the predetermined overcurrent threshold), indicating that an overcurrent has occurred, the provider control circuit 120 will initiate the power limiting mechanism. The power limiting can be implemented in various ways, such as directly shutting off the path switch MSP to stop supplying power from the power conversion circuit 110 to the load unit 20, or limiting output current or power level of the system, for example, by controlling the transistor MSP or the power conversion circuit 110 to adjust the level of the bus current IBUS or the output power level of the bus power.

Figure 3:
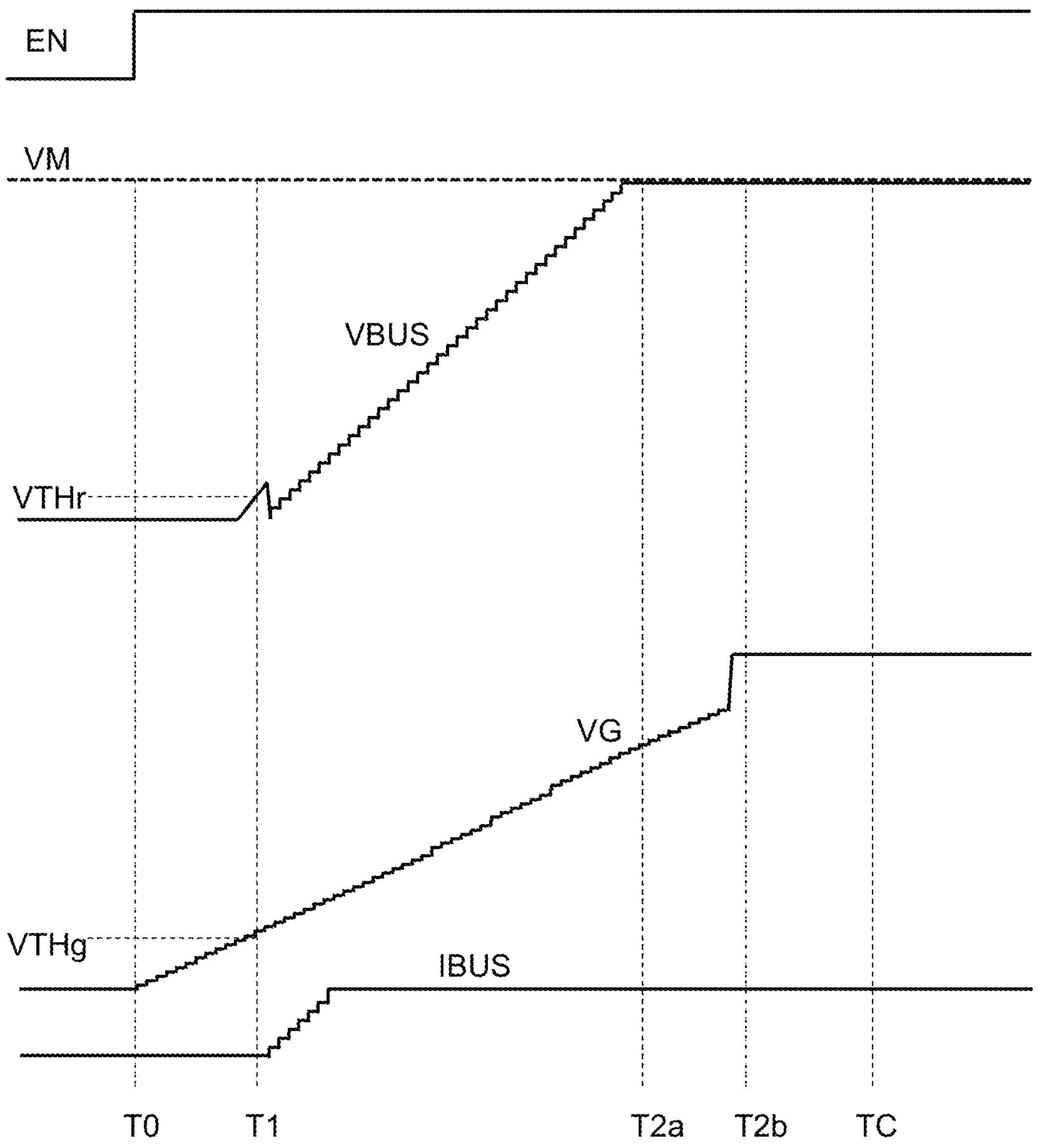
FIG. 3 illustrates the operational waveform of the power conversion and transmission system corresponding to FIG. 2 in one embodiment of the present invention.

In addition to the aforementioned detection methods, there is another method for detecting overcurrent, which can be achieved by sensing voltages at other connected nodes. FIG. 3A shows the operational waveform of one embodiment of the power conversion and transmission system corresponding to FIG. 2. In one embodiment, the provider control circuit 120 generates an output control signal EN to enable the charge pump circuit 130, thereby raising the gate voltage VG to control the conduction of the path switch MSP. In one embodiment, as shown in FIG. 3, after the output control signal EN becomes enabled (high potential) at time T0, the gate voltage VG begins to gradually increase to control the soft start of the path switch MSP.

In one embodiment, the provider control circuit 120 detects the voltage VNCT at the provider-end communication node NCT at a determination time point TC after the output control signal EN is enabled. If VNCT at the determination time point TC exceeds a predetermined threshold VTH1, the provider control circuit 120 can determine that an overcurrent has occurred. This is achieved based the fact the voltage VNCT at the provider-end communication node NCT is related to the ground potential of the load control circuit 220.

Specifically, the ground potential of the load control circuit 220 originates from the load-end ground node NGR, and there is a parasitic resistance 56 present on the ground sub-cable 53 in cable 50. As shown in FIG. 2, the parasitic resistance 56 can be modeled as being coupled between the provider-end ground node NGT and the load-end ground node NGR. If the bus current IBUS flowing through the ground sub-cable 53 is relatively large, when the bus current IBUS passes through the parasitic resistance 56, the voltage across the parasitic resistance 56 will elevate the ground potential at the load-end ground node NGR. This, in turn, causes the voltage VNCT on the communication line related to the load control circuit 220 to also increase. In one embodiment, the threshold VTH1 can be corresponded to the overcurrent threshold. When VNCT exceeds the threshold VTH1, the provider control circuit 120 can determine that an overcurrent (OC) has occurred. Similarly, there is a parasitic resistance 55 present on the power sub-cable 51 in cable 50.

Continuing to refer to FIGS. 2 and 3, another method for determining overcurrent (OC) is based on voltage changes at two different time points. In one embodiment, at the initial time point T1, the provider control circuit 120 measures the voltage VNCT at the provider-end communication node NCT and records it as VNCT_T1. Subsequently, at the determination time point TC, the provider control circuit 120 measures the same node voltage again, recording it as the present voltage level VNCT_TC.

The provider control circuit 120 calculates the difference between these two voltage values, namely Vdiff=VNCT_TC−VNCT_T1. In one embodiment, a threshold VTH2 can be corresponded to the overcurrent threshold. If this difference exceeds a predetermined threshold, such as VTH2, the provider control circuit 120 can determine that an overcurrent (OC) has occurred. At this point, the provider control circuit may shut off the path switch MOSFET, halting the power supply.

The determination time point TC occurs at one or more time points after the readiness time point T2. The readiness time point T2, as shown in FIG. 3, refers to when the bus voltage VBUS rises to a steady-state voltage (e.g., near time point T2*a*) or when the gate voltage VG of the path switch MSP rises to its final value (e.g., at time point T2*b*). Additionally, the present voltage level referred to herein can be sensed periodically (i.e., conducting measurements and determining whether to initiate power limiting) after the readiness time point T2. Another method is to continuously sense the present voltage level VNCT_TC at the provider-end communication node after the readiness time point T2 and perform continuous determinations to decide whether to initiate power limiting. The concepts of the initial time point T1, readiness time point T2, and determination time point TC in the following embodiments are similarly applicable.

Continuing to refer to FIG. 3, the time point when the output control signal EN is enabled is TO. TO indicates that the output control signal EN controls the charge pump circuit 130 to initiate a soft start of the path switch MSP. During this process, the charge pump circuit 130 will gradually ramp up the gate voltage VG of the path switch MSP. As shown in FIG. 3, once the gate voltage VG rises gradually and exceeds a conduction threshold of the path switch MSP (for instance, at the initial time point T1, when the gate voltage VG exceeds the conduction threshold Vthg), the bus voltage VBUS starts to rise, and the bus current IBUS also starts to increase.

Subsequently, after the path switch MSP is turned on to a certain extent, the bus voltage VBUS reaches the same level as the intermediate output power VM (e.g., near T2*a*), and the bus current IBUS tends to stabilize during this process. Additionally, the gate voltage VG continues to rise to an optimal level, which is associated with the level of the bus voltage VBUS and the conduction resistance value of the path switch MSP required by the system. From one perspective, the output voltage of the charge pump circuit 130 (i.e., the gate voltage VG) is a programmable voltage, allowing for soft starts and adaptive adjustments based on the level of the bus voltage VBUS and the target conduction resistance value of the path switch MSP to set its final value.

Continuing to refer to FIG. 3, the aforementioned initial time point T1 can be the moment when the gate voltage VG rises to the conduction threshold Vthg of the path switch MSP or when the bus voltage VBUS rises to a threshold Vthr, where the selection of the threshold Vthr indicates that the bus voltage VBUS has been confirmed to start rising.

In addition to providing multiple methods for determining overcurrent (OC), the present invention also has another important function: to determine whether the current sensing resistor RCS has failed by identifying contradictions between two sets of messages. The following will detail various embodiments of methods to determine the failure of the current sensing resistor RCS according to the present invention.

Continuing to refer to FIG. 3, at the determination time point TC, the provider control circuit 120 can be configured to measure the present voltage level VNCT_TC at the provider-end communication node and the current sensing voltage VCS concurrently. If VNCT_TC exceeds a threshold VTH1 while the current sensing voltage VCS is less than another threshold VTH3, the provider control circuit 120 can determine that the current sensing resistor RCS has failed (for example, short-circuited) and shut off the path switch MSP.

The above judgment is based on the following logic: when the present voltage level VNCT_TC at the provider-end communication node NCT exceeds the threshold VTH1, it indicates that the bus current IBUS is relatively large. However, if the current sensing voltage VCS is less than the threshold VTH3, this implies that the current flowing through the current sensing resistor RCS seems to be very small, leading to a contradiction between the two messages. Therefore, the provider control circuit 120 can infer that the current sensing resistor RCS may have failed. Since the failure of the current sensing resistor RCS could lead to inaccurate current sensing, it is highly preferrable to shut off the path switch MSP to protect the system.

In this embodiment, the threshold VTH1 corresponds to a level of the bus current IBUS at IBUS1, and the threshold VTH3 corresponds to a level of the bus current IBUS at IBUS3. In one embodiment, the current level IBUS1 is greater than or equal to the current level IBUS3. Note that, in this embodiment, the threshold VTH1 does not necessarily correspond to the overcurrent threshold of the bus current IBUS.

In another embodiment, at the determination time point TC, the provider control circuit 120 can determine whether the current sensing resistor RCS has failed based on the difference Vdiff between VNCT_TC and VNCT_T1 (i.e., Vdiff=VNCT_TC−VNCT_T1) and the current sensing voltage VCS. Specifically, if the difference Vdiff exceeds a threshold VTH2 while the current sensing voltage VCS is less than another threshold VTH3, the provider control circuit 120 can determine that the current sensing resistor RCS has failed (for example, short-circuited) and shut off the path switch MSP.

In this embodiment, the threshold VTH2 corresponds to a level of the bus current IBUS at IBUS2, and the threshold VTH3 corresponds to a level of the bus current IBUS at IBUS3. In one embodiment, the current level IBUS2 is greater than or equal to the current level IBUS3. Note that, in this embodiment, the threshold VTH2 does not necessarily correspond to the overcurrent threshold of the bus current IBUS.

FIGS. 6 to 9 show flowcharts of the operation of the power conversion and transmission system in several embodiments of the present invention. The following will explain the steps of the method for controlling the power conversion and transmission system to perform power limiting through these flowcharts.

Figure 6:
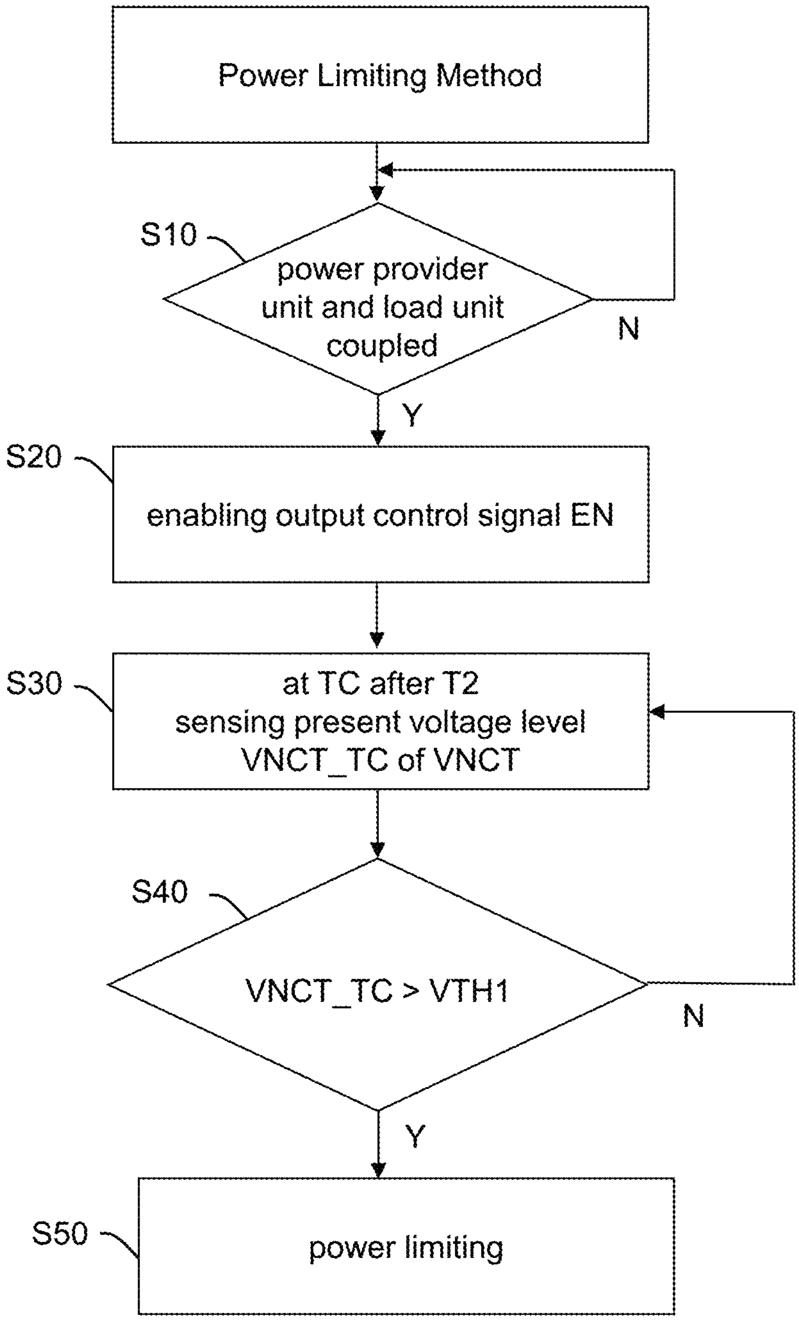
FIGS. 6 to 9 depict flowcharts of the operational processes of the power conversion and transmission system in several embodiments of the present invention.

Referring to FIG. 6, in this embodiment, after the power limiting method begins, the process first proceeds to Step S10: determining whether the power provider unit 10 is coupled to the load unit 20.

If the coupling is determined in Step S10, the process moves to Step S20: enabling the output control signal EN. Next, it proceeds to Step S30: sensing the present voltage level VNCT_TC at the provider-end communication node after a readiness time point T2.

Subsequently, the process moves to Step S40: determining whether the present voltage level VNCT_TC exceeds a threshold VTH1. If the present voltage level VNCT_TC is greater than the threshold VTH1, it indicates a potential overcurrent or other abnormal state, and the process then moves to Step S50: initiating power limiting; if not, it returns to Step S30 to continue sensing the present voltage level VNCT_TC.

Figure 7:
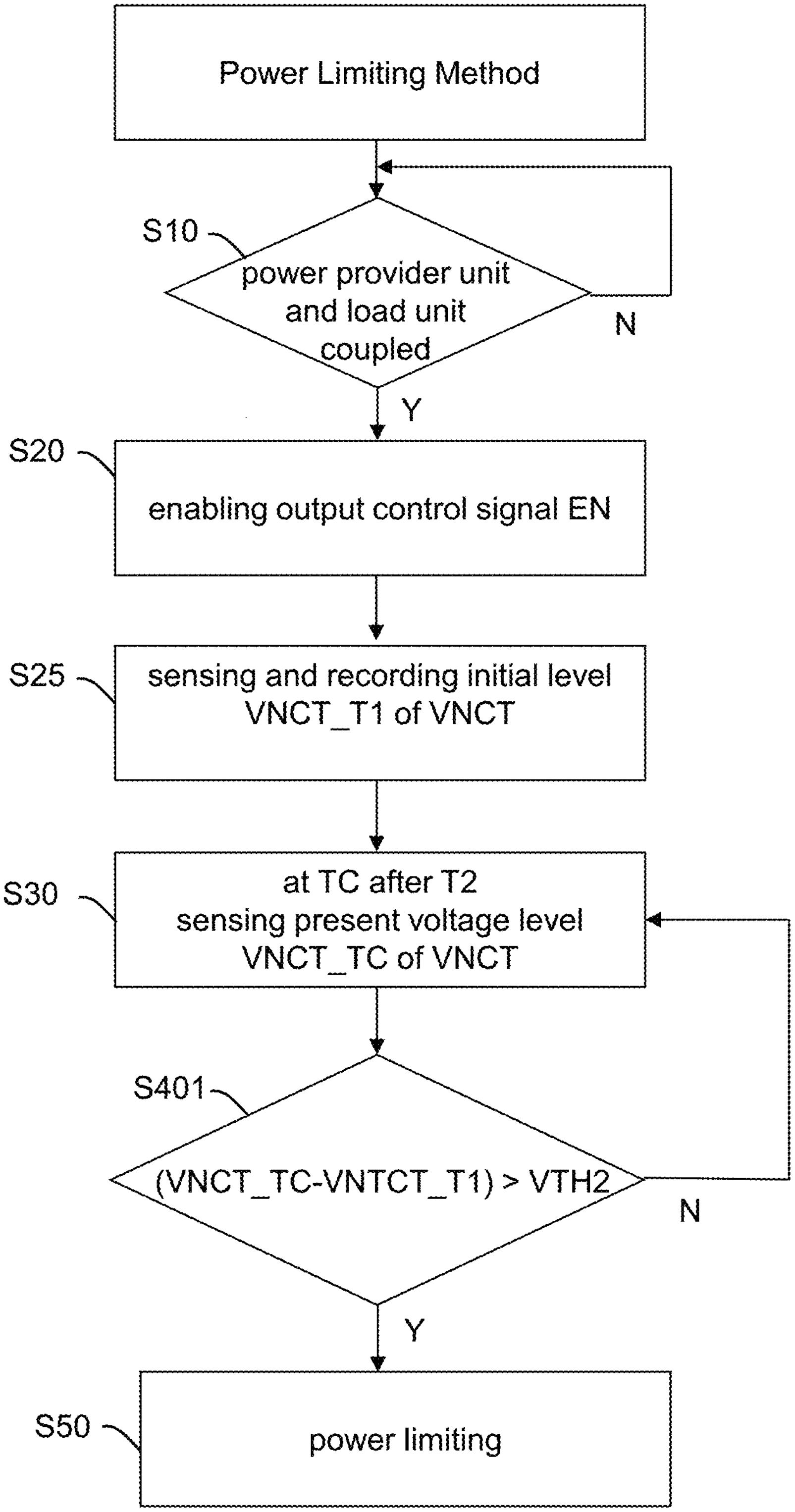

The power limiting method shown in FIG. 7 is similar to the method shown in FIG. 6, with the difference being: in the embodiment of FIG. 7, after Step S20 (enabling the output control signal EN), it moves to Step S25. In Step S25, the provider-end communication node voltage VNCT is sensed and recorded as the initial voltage level VNCT_T1 at the initial time point T1. Following Step S25, it proceeds to Step S30, where the present voltage level VNCT_TC at the provider-end communication node is sensed after the readiness time point T2.

After Step S30, the process moves to Step S401, where it is determined whether the difference between the present voltage level VNCT_TC and the initial voltage level VNCT_T1 is greater than VTH2. If the difference exceeds the threshold VTH2, the process moves to Step S50 to initiate power limiting; if not, it returns to Step S30 to continue sensing the present voltage level VNCT_TC.

Figure 8:
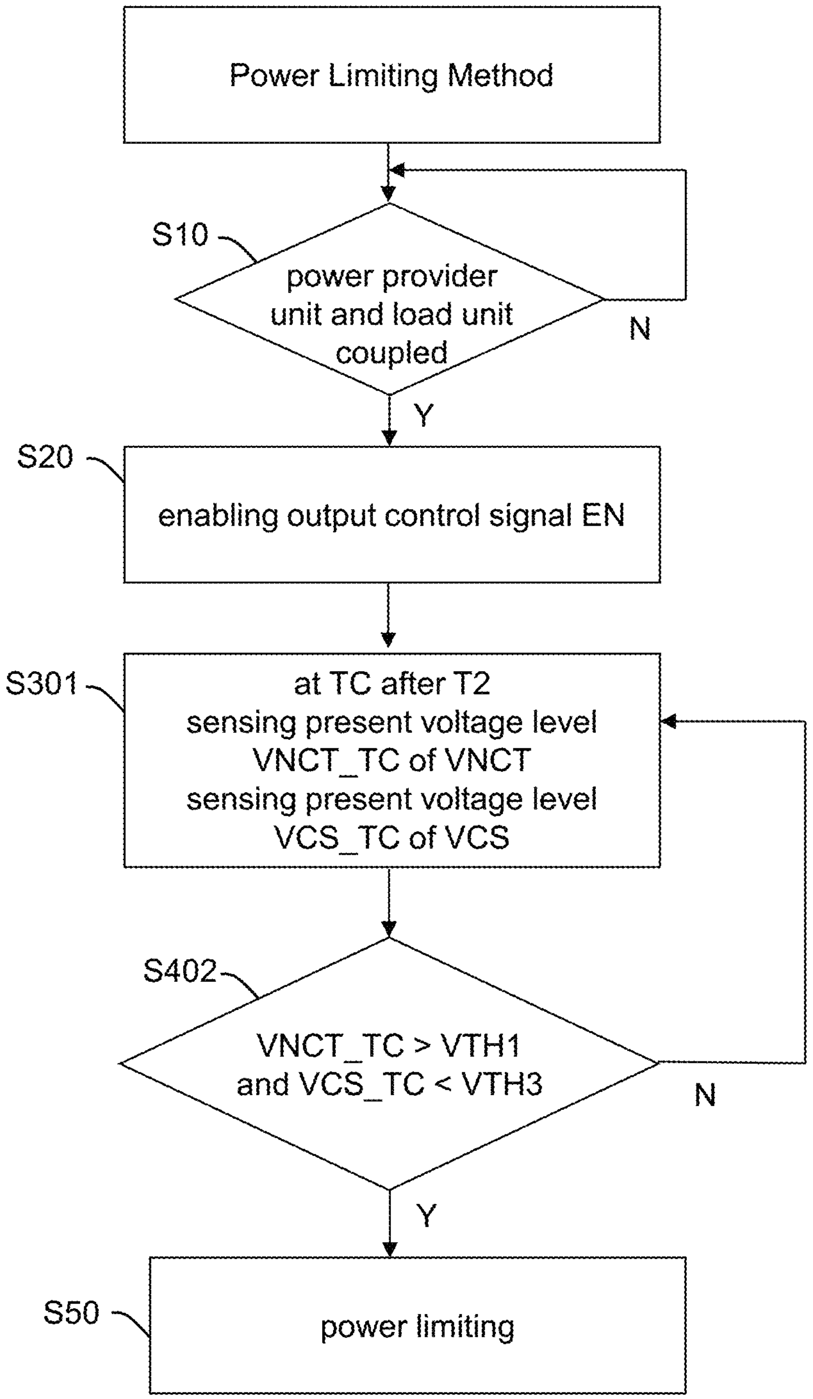

The power limiting method shown in FIG. 8 is similar to the method shown in FIG. 6, with the difference being: after Step S20 (enabling the output control signal EN), it moves to Step S301. In Step S301, in addition to sensing the present voltage level VNCT_TC at the provider-end communication node after the readiness time point T2, the current sensing signal VCS_TC is also sensed.

After Step S301, it proceeds to Step S401. In Step S401, it is determined whether VNCT_TC is greater than VTH1 and whether VCS_TC is less than VTH3. If both conditions are satisfied (i.e., VNCT_TC is greater than VTH1 and VCS_TC is less than VTH3), the process moves to Step S50 to initiate power limiting; if the conditions are not satisfied, it returns to Step S301 to continue sensing.

Figure 9:
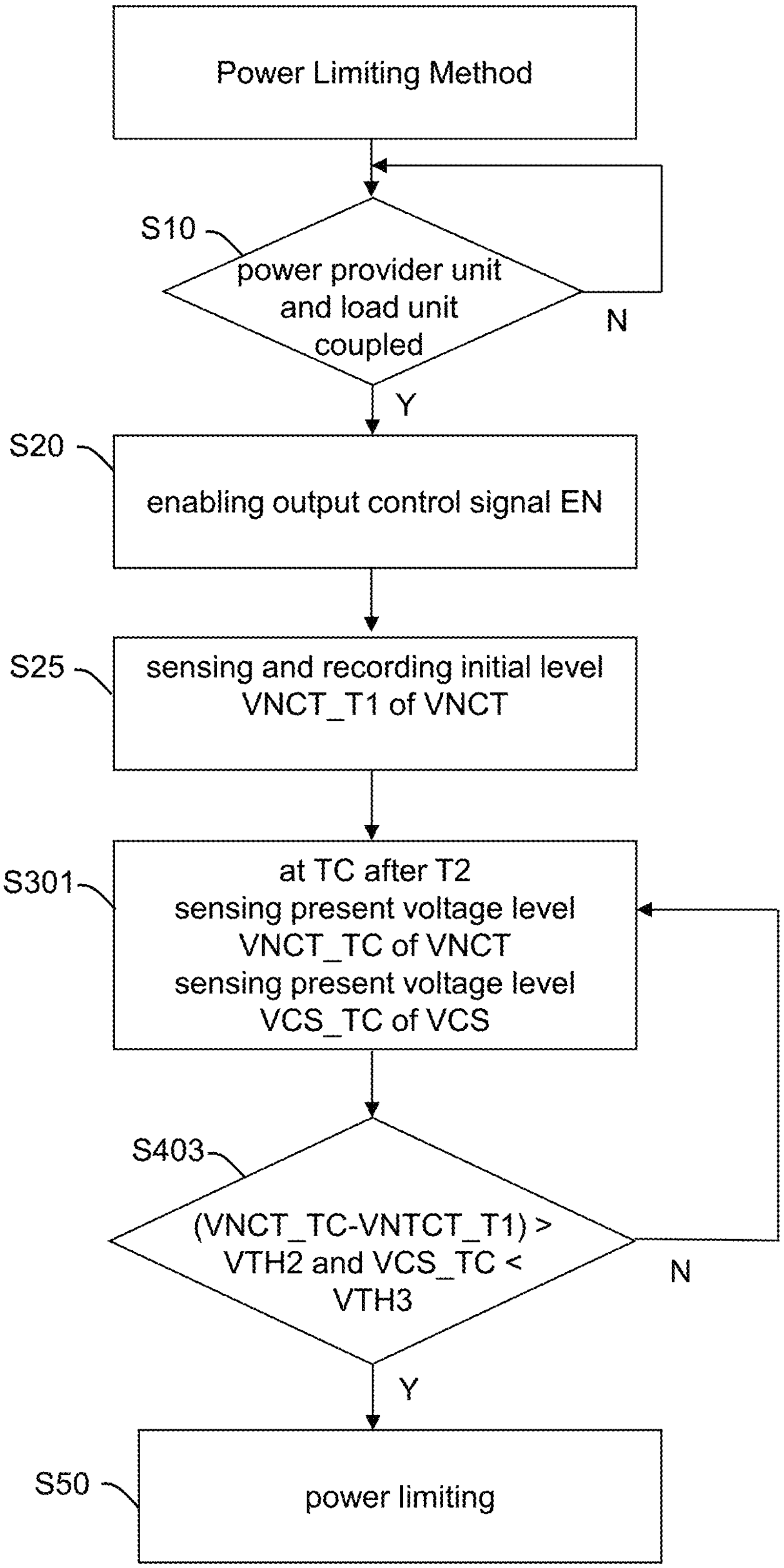

The power limiting method shown in FIG. 9 is similar to the method shown in FIG. 7, with the difference being: after Step S25 (sensing the initial level VNCT_T1), it moves to Step S301, where in addition to sensing the present voltage level VNCT_TC at the provider-end communication node after the readiness time point T2, the current sensing signal VCS_TC is also sensed.

After Step S301, it proceeds to Step S403. In Step S403, it is determined whether the difference Vdiff between VNCT_TC and VNCT_T1 is greater than VTH2 and whether VCS_TC is less than VTH3. If both conditions are satisfied, the process moves to Step S50 to initiate power limiting; if either condition is not met, it returns to Step S301 to continue sensing.

The methods shown in FIGS. 8 and 9 are similar, both determining whether there is a contradiction by assessing the two messages from the current sensing signal VCS and the provider-end communication node voltage VNCT. When VNCT indicates that the bus current is relatively large while the current sensing signal VCS indicates a lower current, this may imply that the current sensing resistor RCS has short-circuited, necessitating the initiation of power limiting in Step S50.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A power conversion and transmission system comprising:

a power provider unit including:

a power conversion circuit for converting an input power into an intermediate output power;

a charge pump circuit for generating a gate voltage;

a provider control circuit for controlling the power conversion circuit and generating an output control signal to control the charge pump circuit; and a path switch coupled between the intermediate output power and a bus power, controlled by the gate voltage, for turning on or off the electrical connection between the intermediate output power and the bus power, wherein the path switch comprises an N-type MOSFET (Metal-Oxide-Semiconductor Field-Effect Transistor);

a load unit coupled between the bus power and a load-end ground node, wherein the bus power supplies power to the load unit and the load unit determines a bus current of the bus power; and a cable including a power sub-cable, a communication sub-cable, and a ground sub-cable, configured to optionally couple a provider-end power node, a provider-end communication node, and a provider-end ground node of the power provider unit correspondingly to a load-end power node, a load-end communication node, and the load-end ground node of the load unit, respectively, wherein the bus current flows through the power sub-cable and the ground sub-cable;

wherein at a determination time point, the provider control circuit senses a present voltage level of the provider-end communication node, and if the present voltage level exceeds a first threshold, a power limiting operation is initiated; or at the determination time point, the provider control circuit calculates a difference between the present voltage level and an initial voltage level, and if the difference exceeds a second threshold, the power limiting operation is initiated, wherein the provider control circuit senses the voltage of the provider-end communication node at an initial time point and records it as the initial voltage level;

wherein the timing for enabling the output control signal occurs before the initial time point and the determination time point, with the initial time point occurring before the determination time point;

wherein in the power limiting operation, the provider control circuit controls the path switch to shut off power supply to the load unit or controls the path switch to limit power level or current level of the bus power.

2. The power conversion and transmission system of claim 1, wherein the ground sub-cable has a parasitic resistance.

3. The power conversion and transmission system of claim 1, wherein the load unit includes a resistive device coupled between the load-end communication node and the load-end ground node.

4. The power conversion and transmission system of claim 1, wherein a level of the gate voltage generated by the charge pump circuit is programmable.

5. The power conversion and transmission system of claim 1, further comprising a current sensing resistor configured in a current path of the bus current to generate a current sensing voltage proportional to the bus current;

wherein at the determination time point, the power limiting operation is initiated further when the voltage level of the current sensing resistor is below a third threshold;

wherein a level of the bus current represented by the first threshold is greater than or equal to a level of the bus current represented by the third threshold, or, a level of the bus current represented by the second threshold is greater than or equal to a level of the bus current represented by the third threshold.

6. The power conversion and transmission system of claim 1, wherein the determination time point occurs after a readiness time point;

wherein the readiness time point refers to a time point when the bus voltage rises to a steady-state voltage; or wherein the readiness time point refers to a time point when the gate voltage of the path switch rises to a final value.

7. The power conversion and transmission system of claim 6, wherein the determination time point includes plural time points triggered periodically after the readiness time point, or the determination time point is continuous time after the readiness time point.

8. A method for controlling a power conversion and transmission system, the power conversion and transmission system comprising a power provider unit, a load unit, and a cable, the power provider unit including: a power conversion circuit for converting an input power into an intermediate output power; and a path switch coupled between the intermediate output power and a bus power for turning on or off the electrical connection between the intermediate output power and the bus power; wherein the load unit is coupled between the bus power and a load-end ground node, wherein the bus power supplies power to the load unit and the load unit determines a bus current of the bus power; wherein the cable includes a power sub-cable, a communication sub-cable, and a ground sub-cable, configured to optionally couple a provider-end power node, a provider-end communication node, and a provider-end ground node of the power provider unit corresponding to a load-end power node, a load-end communication node, and the load-end ground node of the load unit, respectively, wherein the bus current flows through the power sub-cable and the ground sub-cable; the method comprising:

starting enabling the path switch;

at a determination time point, sensing the present voltage level of the provider-end communication node; and if the present voltage level exceeds a first threshold, initiating a power limiting operation; or the method comprising:

starting enabling the path switch;

at a determination time point, calculating a difference between the present voltage level and an initial voltage level; and if the difference exceeds a second threshold, initiating the power limiting operation;

wherein the voltage at the provider-end communication node at an initial time point corresponds to the initial voltage level;

wherein the timing for starting enabling the path switch occurs before the initial time point and the determination time point, with the initial time point occurring before the determination time point;

wherein the steps of the power limiting operation include:

controlling the path switch to shut off power to the load unit or controlling the path switch to limit power level or current level of the bus power.

9. The method of claim 8, wherein the step of enabling the path switch includes soft starting the path switch for turning on.

10. The method of claim 8, wherein the power conversion and transmission system further includes a current sensing resistor configured in a current path of the bus current to generate a current sensing voltage proportional to the bus current;

wherein the method further includes:

at the determination time point, initiating the power limiting operation further when the voltage level of the current sensing resistor is below a third threshold;

wherein a level of the bus current represented by the first threshold is greater than or equal to a level of the bus current represented by the third threshold, or, a level of the bus current represented by the second threshold is greater than or equal to a level of the bus current represented by the third threshold.

11. The method of claim 8, wherein the determination time point occurs after a readiness time point;

wherein the readiness time point refers to a time point when the bus voltage rises to a steady-state voltage; or wherein the readiness time point refers to a time point when the gate voltage of the path switch rises to a final value.

12. The method of claim 11, wherein the determination time point includes plural time points triggered periodically after the readiness time point, or the determination time point is continuous time after the readiness time point.

* * * * *